United States Patent
Phillips

(10) Patent No.: US 7,512,661 B1
(45) Date of Patent: Mar. 31, 2009

(54) MOUNTING EMAIL ADDRESSES IN A FILE SYSTEM

(75) Inventor: Anthony H. Phillips, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/059,023

(22) Filed: Mar. 31, 2008

(51) Int. Cl.
*G06F 15/16* (2006.01)
*G06F 12/00* (2006.01)

(52) U.S. Cl. ...................................... 709/206; 709/207

(58) Field of Classification Search ................ 709/206, 709/207, 238, 245, 250
See application file for complete search history.

(56) References Cited

U.S. PATENT DOCUMENTS

| | | |
|---|---|---|
| 2002/0010743 A1 | 1/2002 | Ryan et al. |
| 2004/0205137 A1 | 10/2004 | Chen et al. |
| 2005/0188174 A1* | 8/2005 | Guzak et al. ................ 711/203 |
| 2005/0198124 A1* | 9/2005 | McCarthy .................... 709/203 |
| 2005/0259658 A1* | 11/2005 | Logan et al. ................ 370/392 |
| 2006/0072723 A1 | 4/2006 | Chung |
| 2007/0180033 A1* | 8/2007 | Singh et al. ................. 709/206 |
| 2007/0288551 A1 | 12/2007 | Sidon |
| 2008/0172468 A1* | 7/2008 | Almeida ..................... 709/206 |

FOREIGN PATENT DOCUMENTS

JP 2000354146 12/2000

OTHER PUBLICATIONS

Gmail Drive Shell Extension, http://www.viksoe.dk/gmail/; Nov. 8, 2007, 3 pages.

* cited by examiner

*Primary Examiner*—Zarni Maung
(74) *Attorney, Agent, or Firm*—Oppenheimer Wolff & Donnelly LLP

(57) ABSTRACT

The present invention discloses a method for mounting email addresses in a file system by creating email virtual folders. The email virtual folders are created through the use of shell extensions in an operating system, and an email address is associated with the email virtual folder. The email virtual folders are utilized by adding one or more files to the email virtual folder. When the files are added to the email virtual folder, the files are sent to the email address(es) associated with the virtual folder. References to the files are stored and viewable in the virtual folder after the email is sent to allow additional file system commands to act upon the files added therein. The email virtual folder may be created and accessed through a graphical user interface or a command line interface.

1 Claim, 2 Drawing Sheets

MOUNTING EMAIL ADDRESSES IN A FILE SYSTEM

FIELD OF THE INVENTION

The present invention generally relates to a file system operating within a computer system. The present invention specifically relates to the ability to mount an email address in a file system operating within a computer system.

BACKGROUND OF THE INVENTION

Shell extensions are commonly used to perform custom actions within an operating system. Examples of shell extensions are menu options in the Windows operating system allowing a user to perform custom actions on files, such as assigning a custom attribute to files in a folder, or a "send to" option to launch a file as an attachment into a new message in a default email program. Shell extensions are commonly implemented as menu options or may appear within the file explorer. Alternatively, shell extensions may perform custom actions in a command-line interface.

Another type of shell extension within the Windows operating system is a namespace extension. Extending the Windows shell with a namespace extension allows a developer to create custom functionality for file access within Windows Explorer. One common use is to enable Windows Explorer to present a view with a list of items that do not exist in one real folder, but actually reside in a number of places. The view on the folder makes it appear as if the items are all stored in one place, so managing them becomes easier.

One example of a namespace extension is an existing program that creates a virtual file system by allowing a user to save and retrieve files in a Gmail email account. This namespace extension appears as a new drive in Windows Explorer, allowing the user to create new folders, copy, and drag/drop files into the drive, which automatically creates new messages containing the files in the user's Gmail email account. This shell extension, however, only transfers files into the user's Gmail email account, and does not allow files to be transferred to other email accounts.

What is needed in the art is a method that makes it simple and easy to send messages and files via email to remote email recipients, through the use of a mountable file system.

BRIEF SUMMARY OF THE INVENTION

The present invention provides a new and unique method for mounting email addresses in a file system. In one embodiment of the invention, this method operates by utilizing a shell extension to create email virtual folders within an operating system. The shell extension contains custom logic to enable the creation and operation of email virtual folders within the operating system, and further enables email-related functions to be performed on data objects added to the virtual folder.

After the shell extension is installed on the computer, the shell extension can be used to create an email virtual folder on the file system. The email virtual folder is a virtual folder associated with an email address, but appears to the operating system as a fully functional folder. This virtual folder allows the operating system to present a list of files that do not exist in one real folder, but actually reside in a number of places. When files are added to the email virtual folder, the files are stored elsewhere within the file system, and references to these files are created within the email virtual folder. Additionally, when files are added to the email virtual folder, an email is sent to the email address associated with the email virtual folder enclosing the added files. In one embodiment, the email is sent through the default email application in the operating system. In an additional embodiment, the email is sent after being processed by the shell extension. This processing may include parsing the files added to the virtual folder and performing custom functionality based on the content or type of the files added.

The email sent to the email recipient contains the one or more files added to the email virtual folder. The virtual folder can be later accessed by the user to perform actions on the file(s) and view the files sent to the email recipient. In an additional embodiment, the present invention can be used in conjunction with a UNIX mount file system command, and the functionality of the email virtual folder may be accessed through the command line. Additionally, the email virtual folder may be used in conjunction with other file system tools.

DETAILED DESCRIPTION OF THE INVENTION

One aspect of the present invention relates to a method that enables a user to easily mount email addresses as a virtual file system within a computer system, enabling the user to store files within this virtual file system and send the files added to this virtual file system to email recipients. This method enables easy creation and management of email distribution lists and email attachments, while facilitating the ability to integrate email functionality with other file system tools.

One embodiment of the present invention relates to a shell extension. In this embodiment, a user may create a virtual folder that is associated with a specified email address through use of the shell extension. For example, this virtual folder may be named "ant@email.com", and the folder is associated to perform actions in the folder to email recipient ant@email.com. In a further embodiment, virtual email folders are automatically created when new contacts are created in a default email application.

Any files copied into this virtual folder are automatically emailed to the named email address. The files added to this virtual folder are stored in the virtual folder even after the email is sent so that standard hard disk commands (dir, grep, copy, etc.) are able to be utilized. Further, the shell extension may be configured to utilize the default system email application to send the email message, similar to the existing "Send To>Mail Recipient" shell extension functionality found in Windows.

The present invention may be implemented within any operating system as a shell extension, such as the Windows operating system or a Unix-based operating system. In Windows, the shell extension may be implemented as a file system extension to allow creation of the email virtual folder, or alternatively it may be implemented as a namespace extension to have the email virtual folder appear as a "virtual drive" within Windows Explorer.

Figure 1:
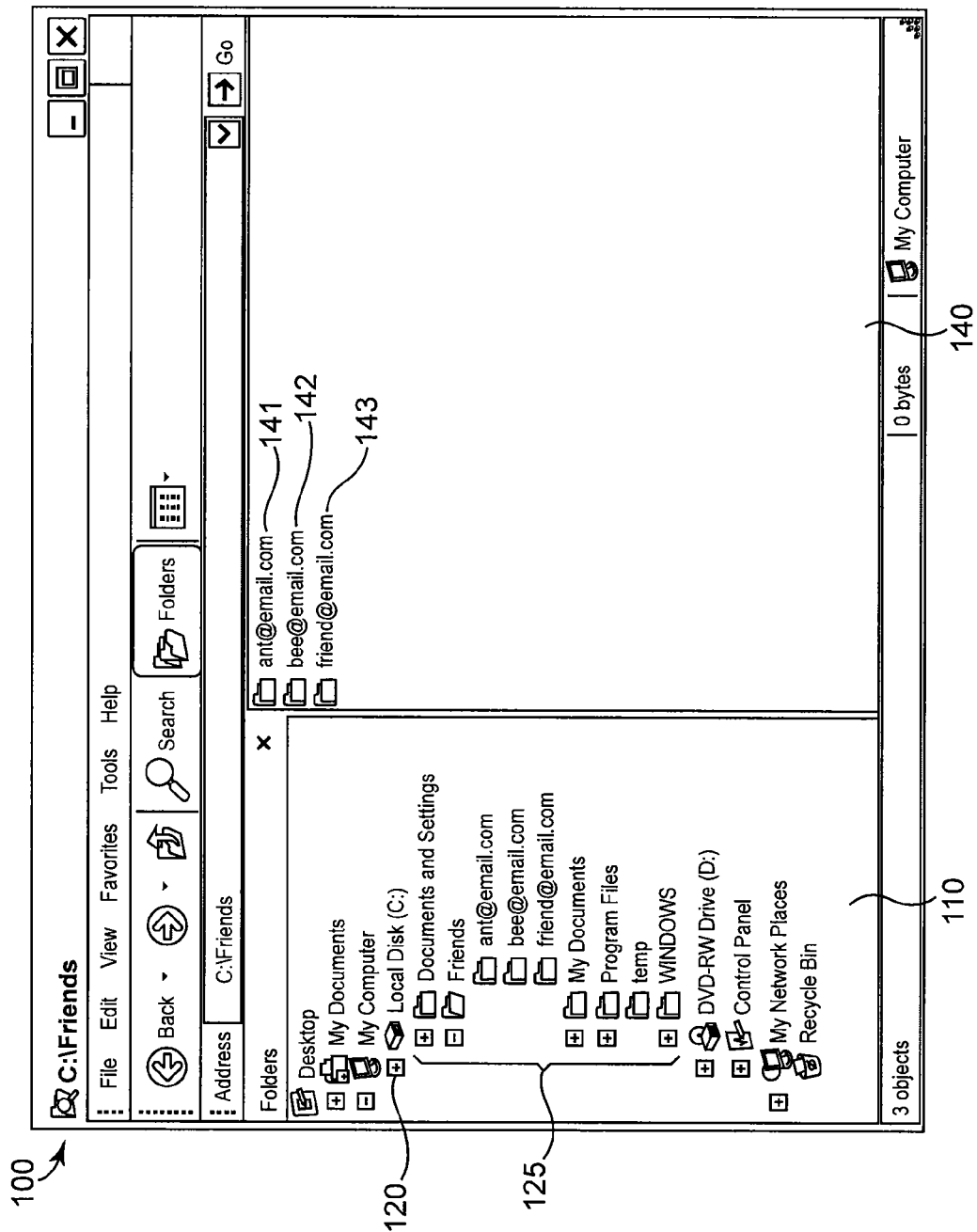
FIG. 1 illustrates an exemplary file explorer graphical user interface demonstrating use of email virtual folders in one embodiment of the present invention.

FIG. 1 depicts an exemplary file explorer graphical user interface demonstrating use of email virtual folders according to one embodiment of the present invention. Although FIG. 1 depicts a file system interface similar to Windows Explorer, one skilled in the art can appreciate that a file system may also be accessed via other graphical interfaces or a command line program (e.g., ls).

In FIG. 1, a file explorer window 100 allows a graphical depiction of the file system. The folder list 110 contains a list of drives within the system, with the local disk C: drive 120 expanded to list a number of folders 125 on the drive. The folder C:\Friends 130 is selected and its contents are displayed. As depicted, folder C:\Friends 130 is a regular file system folder.

The contents of the C:\Friends folder 130 are depicted in a folder view 140 displaying three email virtual folders 141, 142, 143. Email virtual folder 141 is named ant@email.com, and is associated with the email address ant@email.com. Similarly, email virtual folder 142 is named bee@email.com, email virtual folder 143 is named friend@email.com, and each folder is associated with the named email address.

In a UNIX-based operating system, the present invention may be implemented as an extension to the mount file system command. For example, the command could be similar to: "mount -F email ant@email.com/fiends/ant", where the -F option is used to specify the file system type on which to operate, email is the shell extension, ant@email.com is the recipient's email address, and /friends/ant is the virtual folder to be created.

By mounting email addresses into the file system, the present invention enables an easy way to send files and data to recipients through file system actions via email. For example, a user can drag and drop a link from a web browser and drop it onto an email virtual folder to send an email recipient the link. Additionally, a user may copy files via a file system browser like Windows Explorer directly into an email virtual folder. Opening the email virtual folder at a later time displays a reference to each of the files that have been added to the virtual folder, and additionally enables quick display of all files that have been emailed to the user.

Additionally, in command-line interfaces, the use of an email shell extension through a command line application allows email to be incorporated into commands performed in the shell and used in conjunction with file system tools. This facilitates an easy way to email, process, and output the file via the command line.

Figure 2:
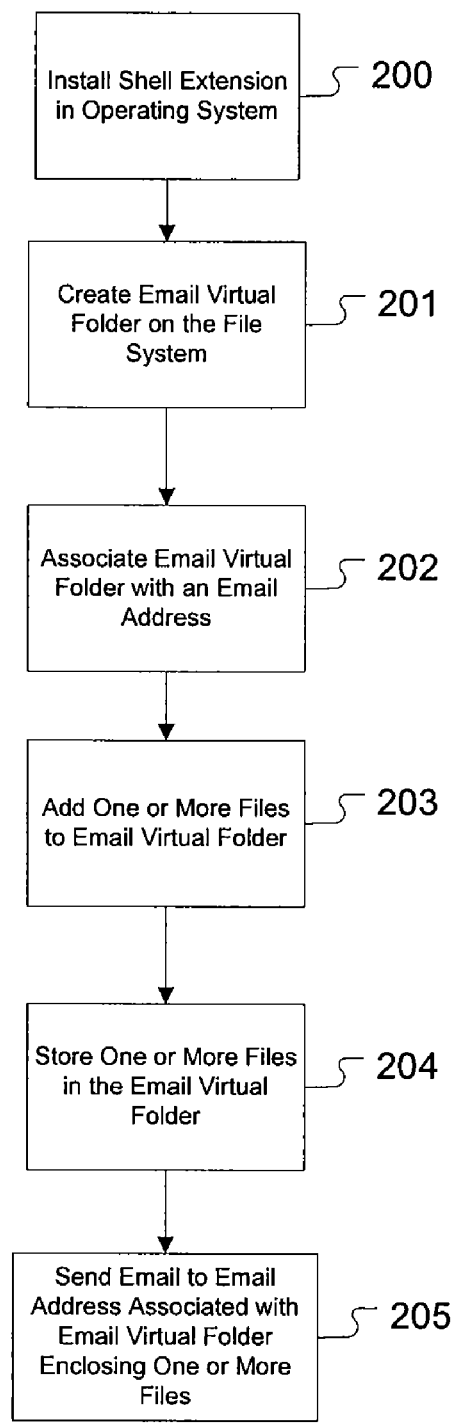
FIG. 2 illustrates an exemplary operation of the method for mounting email addresses in a file system in accordance with one embodiment of the present invention.

FIG. 2 depicts a workflow utilized for mounting email addresses in a file system according to one embodiment of the present invention. The following steps demonstrate an embodiment of the invention which uses a shell extension to send emails actions upon an email virtual folder. In related embodiments of the present invention, the files may be sent from the virtual folders to alternative communication mediums.

In step 201, the user installs the email process in the operating system attached to a file system. In one embodiment of the present invention, this is a shell extension enabling the use of email virtual folders within the operating system.

In step 202, the user creates a virtual folder with the shell extension in the file system. As described above, the virtual folder appears as a typical folder to the user when the operating system accesses the file system. This virtual file system folder is the identifier of a communications target, such as an email address. In one embodiment of the present invention, the virtual folder is an email virtual folder, and the name of the folder appears to the user as the recipient's email address.

In step 203, one or more files are added to the virtual folder, and in step 204, references to one or more files on the file system are stored within the virtual folder. In step 205, the files are sent to the recipient associated with the virtual folder via the shell extension. Thus, files created, dropped, copied, moved to the virtual folder are automatically communicated to the target. For example, dropping a text file on an email virtual folder named "friend@email.com" will mail the text file to the friend@email.com email address. As discussed below, a further extension of the present invention allows distribution list folders, and special interpretation of certain file types or filenames to allow for automatic insertion of information or prompting for user input.

A further embodiment of the present invention relates to the use of email distribution lists. The shell extension may further allow the creation of a distribution list folder, which is another kind of virtual folder that includes links to virtual email address folders. In this configuration, links are kept in the distribution list folder, and the actual virtual email address folders are stored elsewhere. Thus, any files copied into the distribution list folder would automatically be sent to all the recipients who are linked to virtual email folder from the distribution list folder.

In a further embodiment, dragging and dropping files into the virtual folder could trigger customized behavior and processing. One type of processing may be to parse the file and perform customized actions on the file. For example, if the file name had a particular well-known file extension, such as template, then the shell extension could process the file differently. It could, for example, use the contents of the file as the text of the email message. The content could include markup characters where the user should be prompted for input. For example, the text string: "Dear % Title % Surname," would be processed by the shell extension to prompt the user for a title and surname of the recipient.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for mounting email addresses in a file system, comprising:

installing a shell extension in an operating system attached to a file system, the shell extension enabling one or more email virtual folders to appear within a view of the file system in the operating system;

creating an email virtual folder on the file system, wherein the email virtual folder is a virtual folder configured to reference files stored elsewhere within the file system and wherein the email virtual folder is associated with an email address;

adding one or more files existing on the file system to the email virtual folder;

storing references to the one or more files existing on the file system within the email virtual folder responsive to the one or more files being added to the email virtual folder;

sending an email to the email address associated with the email virtual folder via the shell extension responsive to the one or more files being added to the email virtual folder, the email containing the one or more files added to the email virtual folder;

wherein the references to the one or more files stored within the file system and added to the email virtual folder appear within the view of the file system when the email virtual folder is accessed within the operating system.

* * * * *